(12) United States Patent
Renner et al.

(10) Patent No.: US 11,885,380 B2
(45) Date of Patent: Jan. 30, 2024

(54) DOG CLUTCH AND DRIVE ARRANGEMENT

(71) Applicant: ZF Friedrichshafen AG, Friedrichshafen (DE)

(72) Inventors: Stefan Renner, Bodman-Ludwigshafen (DE); Martin Weiss, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 116 days.

(21) Appl. No.: 17/552,933

(22) Filed: Dec. 16, 2021

(65) Prior Publication Data

US 2022/0196083 A1 Jun. 23, 2022

(30) Foreign Application Priority Data

Dec. 18, 2020 (DE) ...................... 10 2020 216 240.9

(51) Int. Cl.
*F16D 23/14* (2006.01)
*B60K 1/02* (2006.01)
(Continued)

(52) U.S. Cl.
CPC ............... *F16D 23/14* (2013.01); *B60K 1/02* (2013.01); *F16D 11/10* (2013.01); *F16D 21/02* (2013.01); *F16D 21/06* (2013.01); *F16H 3/66* (2013.01); *F16D 2011/002* (2013.01); *F16D 2011/004* (2013.01); *F16H 2063/3093* (2013.01);
(Continued)

(58) Field of Classification Search
CPC ......... F16D 2011/002; F16D 2011/004; F16D 11/10; F16D 11/14; F16D 21/02; F16D 23/14; F16H 63/30; F16H 2063/3093; F16H 2200/2007; F16H 2200/0021; F16H 2200/2034; F16H 2200/2041; F16H 2200/2064; F16H 2200/2094;
(Continued)

(56) References Cited

U.S. PATENT DOCUMENTS

2006/0076206 A1* 4/2006 Rudle .................... F16D 11/14
192/48.8
2017/0146098 A1 5/2017 Ziemer
2022/0364631 A1* 11/2022 Glückler .................. F16H 3/66

FOREIGN PATENT DOCUMENTS

DE 10 2013 215 681 A1 2/2015
DE 10 2014 201 250 A1 7/2015
(Continued)

OTHER PUBLICATIONS

German Search Report Corresponding to 10 2020 216 240.9 dated Sep. 7, 2021.

*Primary Examiner* — Richard M Lorence
(74) *Attorney, Agent, or Firm* — Finch & Maloney PLLC

(57) ABSTRACT

Claw-type shifting mechanism (5) with a first sliding sleeve (17) and a fixed coupling element (19). In order to produce a passage, the first sliding sleeve (17) and the coupling element (19) each respectively have at least one recess (31, 35) and at least one web section (32, 36), in which the first sliding sleeve (17) and the coupling element (19) can be arranged together radially on the outside on a first shaft. The first sliding sleeve (17) can be displaced along the first shaft and the coupling element (19) can be connected firmly to the first shaft. The drive arrangement (1) comprises at least one drive machine, a transmission with a first shaft, a second shaft and a third shaft, a housing, and a claw-type shifting mechanism (5) of this type.

8 Claims, 3 Drawing Sheets

(51) Int. Cl.
  *F16D 11/10* (2006.01)
  *F16D 21/02* (2006.01)
  *F16D 21/06* (2006.01)
  *F16H 3/66* (2006.01)
  *F16D 11/00* (2006.01)
  *F16H 63/30* (2006.01)
(52) U.S. Cl.
  CPC ............... *F16H 2200/2007* (2013.01); *F16H 2200/2094* (2013.01); *F16H 2200/2097* (2013.01)
(58) Field of Classification Search
  CPC ...... F16H 2200/2097; F16H 3/44; F16H 3/66; B60K 1/02
  USPC .............................................. 192/69.71, 69.9
  See application file for complete search history.

(56) References Cited

FOREIGN PATENT DOCUMENTS

| | | |
|---|---|---|
| DE | 10 2014 208 794 A1 | 11/2015 |
| DE | 10 2014 208 806 A1 | 11/2015 |
| DE | 10 2019 205 748 A1 | 10/2020 |

\* cited by examiner

DOG CLUTCH AND DRIVE ARRANGEMENT

This application claims priority from German Patent Application Serial No. 10 2020 216 240.9 filed on Dec. 18, 2020.

FIELD OF THE INVENTION

The invention relates to a claw-type shifting mechanism with a first sliding sleeve and a fixed coupling element, wherein to produce a passage the first sliding sleeve and the coupling element each have at least one recess and at least one web section. In addition, the invention relates to a drive arrangement comprising at least one drive machine, a transmission with a first shaft, a second shaft and a third shaft, and a housing.

BACKGROUND OF THE INVENTION

The document DE 10 2014 201 250 A1 relates to a device for the shiftable coupling of a basis with two coaxial shafts, namely an outer shaft in the form of a hollow shaft and an inner shaft arranged radially inside the outer shaft, which device comprises an axially displaceable sliding sleeve mounted in a rotationally fixed manner on the basis, which forms a first functional connection arrangement which, in a first sliding position of the sliding sleeve, is connected in a rotationally fixed manner to a corresponding functional connection arrangement of the inner shaft, and a second functional connection arrangement which, in a second sliding position of the sliding sleeve, forms a rotationally fixed connection with a corresponding functional connection arrangement of the outer shaft. To reduce the fitting space required, having regard to the said document DE 10 2014 201 250 A1, it is proposed to arrange the sliding sleeve radially between the inner shaft and the outer shaft and to mount it on a hub fixed to the basis, on the outside of which hub, the outer shaft is fitted and on the inside of which hub the inner shaft is fitted, wherein the hub has slit-like radial perforations through which one of the functional connection arrangements of the sliding sleeve projects.

SUMMARY OF THE INVENTION

The purpose of the present invention is to improve the structure and/or functionality of a claw-type shifting mechanism of the type mentioned to begin with. In addition, the purpose of the present invention is to improve the structure and/or functionality of a drive arrangement of the type mentioned to begin with.

The objective is achieved with a claw-type shifting mechanism having the features specified in the claims. In addition the objective is achieved with a drive arrangement having the features specified in the claims. Advantageous embodiments and/or further developments are the object of the subordinate claims.

The claw-type shifting mechanism serves for engaging and/or closing shiftable connections. In the present context, a "shiftable connection" means in particular a connection in a mechanical power path which can be shifted between an open shift position in which the mechanical power path is interrupted and no mechanical power flow is possible by way of the said connection, and a closed shift position in which the mechanical power path is established and a mechanical power flow by way of the connection is enabled. In the present context, "shifting" means, in particular, the opening or closing of a shiftable connection and/or changing between an open shift position and a closed shift position. Mechanical power includes, in particular, a torque and/or an angular speed.

A sliding sleeve is, in particular, a machine element that serves as a shifting element for shifting at least one shiftable connection. A sliding sleeve can comprise an actuation section for acting upon the sliding sleeve with an actuating force, a first connecting section for connecting to a first machine element and at least one further connecting section for connecting to at least one further machine element. The connecting sections of a sliding sleeve can be designed in the form of teeth. The said teeth can be axially displaceable. Machine elements that can be connected with the help of a sliding sleeve can be shafts, gearwheels and/or a housing. A sliding sleeve can be moved between at least two shift positions. A sliding sleeve can be connected rotationally fixed to a shaft and can be moved along the shaft.

The claw-type shifting mechanism, the first sliding sleeve, the coupling element and the first shaft can have a common axis. The first sliding sleeve can be displaceable along the said axis. Where not otherwise stated or not otherwise indicated by the context, the terms "axial", "radial" and "in the circumferential direction" relate to a direction in which the axis extends. "Axial" then corresponds to the said extension direction of the axis. "Radial" is then a direction perpendicular to the extension direction of the axis, which intersects the axis. "In the circumferential direction" then corresponds to a circular curved direction around the axis. The axis can be a rotational axis and/or a linear axis. The term "first sliding sleeve" in this case does not imply that there must necessarily also be a further sliding sleeve.

The first sliding sleeve can extend over a larger axial range than the coupling element. The first sliding sleeve can have a sleeve-like, tubular or hollow-cylindrical form. The first sliding sleeve can have axial sections with different outer diameters. The first sliding sleeve can have at least one axial section with an outer diameter suitable for receiving the coupling element. The first sliding sleeve can have three connecting sections. The connecting sections of the first sliding sleeve can be arranged axially in sequence. The connecting sections of the first sliding sleeve can respectively be arranged radially on the inside or radially on the outside. The connecting sections of the first sliding sleeve can respectively be in the form of inner teeth or outer teeth. The first sliding sleeve can have two end sections and a central section arranged between the said end sections. The first sliding sleeve can be able to be connected rotationally fixed on the first shaft and to be axially displaced relative to the first shaft.

The term "fixed" is used with reference to the coupling element, in particular, to limit the mobility of a sliding sleeve. The coupling element can be connectable rotationally and axially fixed to the first shaft. The coupling element can extend over a smaller axial range than the first sliding sleeve. The coupling element can have a ring-like, disk-like, wheel-like of flange-like form. The coupling element can have two connecting sections. One connecting section can be arranged radially on the inside of the coupling element and one connecting section can be arranged radially on the outside of the coupling element. One connecting section of the coupling element can be in the form of internal teeth and one connecting section of the coupling element can be in the form of external teeth.

The first sliding sleeve can have at least one recess and at least one web section. The at least one recess of the first sliding sleeve can be passed through essentially in the radial direction. The at least one recess of the first sliding sleeve can have at least a length, in the axial direction, that corresponds to a maximum shifting path between the shifting positions. The at least one web section of the first sliding sleeve can extend essentially in the axial direction. The first sliding sleeve can have a plurality of recesses and web sections arranged in alternation, distributed in the circumferential direction. The at least one recess and the at least one web section of the first sliding sleeve can be arranged on the central section.

The coupling element can have at least one recess and at least one web section. The at least one recess of the coupling element can be accessed essentially in the axial direction. The at least one web section of the coupling element can extend essentially in the radial direction. The coupling element can have a plurality of recesses and web sections arranged in alternation, distributed in the circumferential direction. The at least one recess and the at least one web section of the coupling element can be arranged radially on the inside.

The at least one web section of the first sliding sleeve can extend through the at least one recess of the coupling element. The at least one web section of the coupling element can extend through the at least one recess of the first sliding sleeve. The reach can include the at least one recess of the first sliding sleeve, the at least one web section of the first sliding sleeve, the at least one recess of the coupling element and the at least one web section of the coupling element. The first sliding sleeve and the coupling element can be arranged axially in sequence on the first shaft. The coupling element can be arranged on the central section of the first sliding sleeve. The first sliding sleeve and the coupling element can be arranged in each case directly on the first shaft. In this context, "directly" means in particular that no other machine elements are arranged between the first sliding sleeve and the coupling element, on the one hand, and the first shaft, on the other hand.

The first sliding sleeve can be shifted between a first shift position in which a connection between the first shaft and a housing can be closed, a second shift position in which a connection can be released, a third shift position in which a connection between the first shaft and a second shaft can be closed, a fourth shift position in which a connection can be released, and/or a fifth shift position in which a connection between the first shaft and a third shaft can be closed. The claw-type shifting mechanism, the first sliding sleeve, the coupling element, the first shaft and the third shaft can have a common axis.

The claw-type shifting mechanism can comprise a shiftable second sliding sleeve. The claw-type shifting mechanism, the first sliding sleeve, the second sliding sleeve, the coupling element and the first shaft can have a common axis. The second sliding sleeve can extend over a larger axial range than the coupling element and/or over a smaller axial range than the first sliding sleeve. The second sliding sleeve can have a sleeve-like, tubular or hollow-cylindrical form. The second sliding sleeve can have two connection sections. The connection sections of the second sliding sleeve can be arranged radially in sequence. One connection section can be arranged on the second sliding sleeve radially on the inside and one connection section can be arranged on the second sliding sleeve radially on the outside. One connection section of the second sliding sleeve can be in the form of internal teeth and one connection section of the second sliding sleeve can be in the form of external teeth.

The second sliding sleeve can be shifted between a first shift position in which a connection between a drive machine and the first shaft can be closed, a second shift position in which a connection can be released, and a third shift position in which a connection between the drive machine and a third shaft can be closed.

The passage can be made with play. In the first shift position of the second sliding sleeve, the passage can be made free from load, in order to enable an axial displacement of the first sliding sleeve for shifting purposes. The passage can be made without load because no mechanical power flow takes place by way of the first sliding sleeve.

The second sliding sleeve can be mounted on the first sliding sleeve. The second sliding sleeve can be mounted on the first sliding sleeve in such a manner that it can be displaced axially and/or rotated.

The claw-type shifting mechanism can comprise at least one clutch element. The at least one clutch element can have an axis. The claw-type shifting mechanism, the first sliding sleeve, the coupling element, the at least one clutch element and the first shaft can have a common axis. The at least one clutch element can have a sleeve-like, tubular or hollow-cylindrical form. The at least one clutch element can have two connection sections. The connection sections of the at least one clutch element can be arranged axially in sequence. The connection sections of the at least one clutch element can each be arranged radially on the inside or radially on the outside. The connection sections of the at least one clutch element can each be in the form of internal teeth or external teeth. The connection sections of the at least one clutch element can be arranged radially in sequence. One connection section of the at least one clutch element can be arranged on the at least one clutch element radially on the inside and one connection section of the at least one clutch element can be arranged on the at least one clutch element radially on the outside. One connection section can be arranged on the at least one clutch element be in the form of internal teeth and one connection section can be arranged on the at least one clutch element be in the form of external teeth. The at least one clutch element can be a fixed clutch element.

The claw-type shifting mechanism can comprise a first clutch element that can be connected rotationally and axially fixed to the first shaft, and serves the purpose of enabling a connection of the first sliding sleeve to the first shaft. The claw-type shifting mechanism can comprise a second clutch element that can be connected rotationally and axially fixed to the second shaft, and serves the purpose of enabling a connection of the first sliding sleeve to the second shaft. The claw-type shifting mechanism can comprise a third clutch element that can be connected rotationally and axially fixed to the third shaft, and serves the purpose of enabling a connection of the first sliding sleeve to the third shaft. The claw-type shifting mechanism can comprise a fourth clutch element that can be connected rotationally and axially fixed to the third shaft, and serves the purpose of enabling a connection of the second sliding sleeve to the third shaft.

The drive arrangement can serve to power a motor vehicle. A mechanical power path can serve to transmit a traction drive power and/or to support a mechanical power during a powershift. In this context, "powershift" refers in particular to a change between shift steps of the transmission without traction force interruption or with reduced traction force loss.

The drive arrangement can comprise a first drive machine and a second drive machine. The at least one drive machine can be an electric machine. The electric machine can comprise a stator and a rotor. The electric machine can be operated as a motor and/or as a generator. The transmission can have shift steps. The shift steps can have different gear ratios. The transmission can comprise at least one planetary gearset. The transmission can comprise a first planetary gearset and a second gearset. The planetary gearsets can each comprise a sun gear, a planetary carrier and a ring gear. The first, second and third shafts can be transmission inputs. The first shaft can serve to drive the sun gear of the second planetary gearset. The second shaft can serve to drive the planetary carrier of the first planetary gearset and the ring gear of the second planetary gearset. The third shaft can serve to drive the sun gear of the first planetary gearset. The claw-type shifting mechanism can be arranged in the housing. The transmission can have a drive output. With the help of the transmission shift steps, the transmission can be powershifted. With the help of the coupling element, a mechanical drive output power at the first drive machine can be supported during a shift. The first, second and third shafts can be fitted one inside another. The first shaft can be fitted inside the second shaft. The second shaft can be fitted inside the third shaft. The first shaft can be a hollow or a solid shaft. The second and third shafts can be in the form of hollow shafts. The shafts have in each case an end on the claw-type shifting mechanism side. The ends of the shafts are arranged in axial sequence in such a manner that each shaft is accessible in the radial direction.

The first sliding sleeve, the coupling element and the first shaft can be connected rotationally fixed to one another and can rotate together about the axis. For shifting purposes, the first sliding sleeve can be axially displaceable relative to the coupling element and the first shaft. The second sliding sleeve and the first drive machine can be connected rotationally fixed to one another and can rotate together about the axis. For shifting purposes, the second sliding sleeve can be axially displaceable relative to the first drive machine.

The drive arrangement can have at least one actuator. With the help of an electrical control device the at least one actuator can be controlled. The control device can serve for the control in regulatory and/or control technology terms of the at least one actuator. The at least one actuator can be an electric motor actuator or a hydraulic actuator. The drive arrangement can have a first actuator for shifting the first sliding sleeve. The drive arrangement can have a second actuator for shifting the second sliding sleeve.

In summary, and expressed in other words, by virtue of the invention, among other things a claw-type shifting mechanism is obtained, with penetration for supported shifting. The coupling element and the first sliding sleeve are decoupled from one another, so that the first sliding sleeve remains free from load even when the coupling element is transmitting a mechanical power flow. The first shaft can be reached directly radially from the outside. The first sliding sleeve can have at least two perforations, through which the coupling element engages with the first shaft and can transmit a mechanical output. The first sliding sleeve is connected with that shaft in a rotationally fixed manner. The perforations can have at least an axial length such that a shifting process with the first sliding sleeve is enabled. For the assembly of the coupling element the first sliding sleeve has diameter jumps.

The invention makes possible a gearshift at the same time as a mechanical power flow. Structural and functional integration are enabled. A mechanical power flow that crosses through the first sliding sleeve is made possible by way of the first shaft.

BRIEF DESCRIPTION OF THE DRAWINGS

Below, example embodiments of the invention are described in greater detail with reference to figures which show, schematically and as examples.

DETAILED DESCRIPTION OF THE PREFERRED EMBODIMENTS

Figure 1:
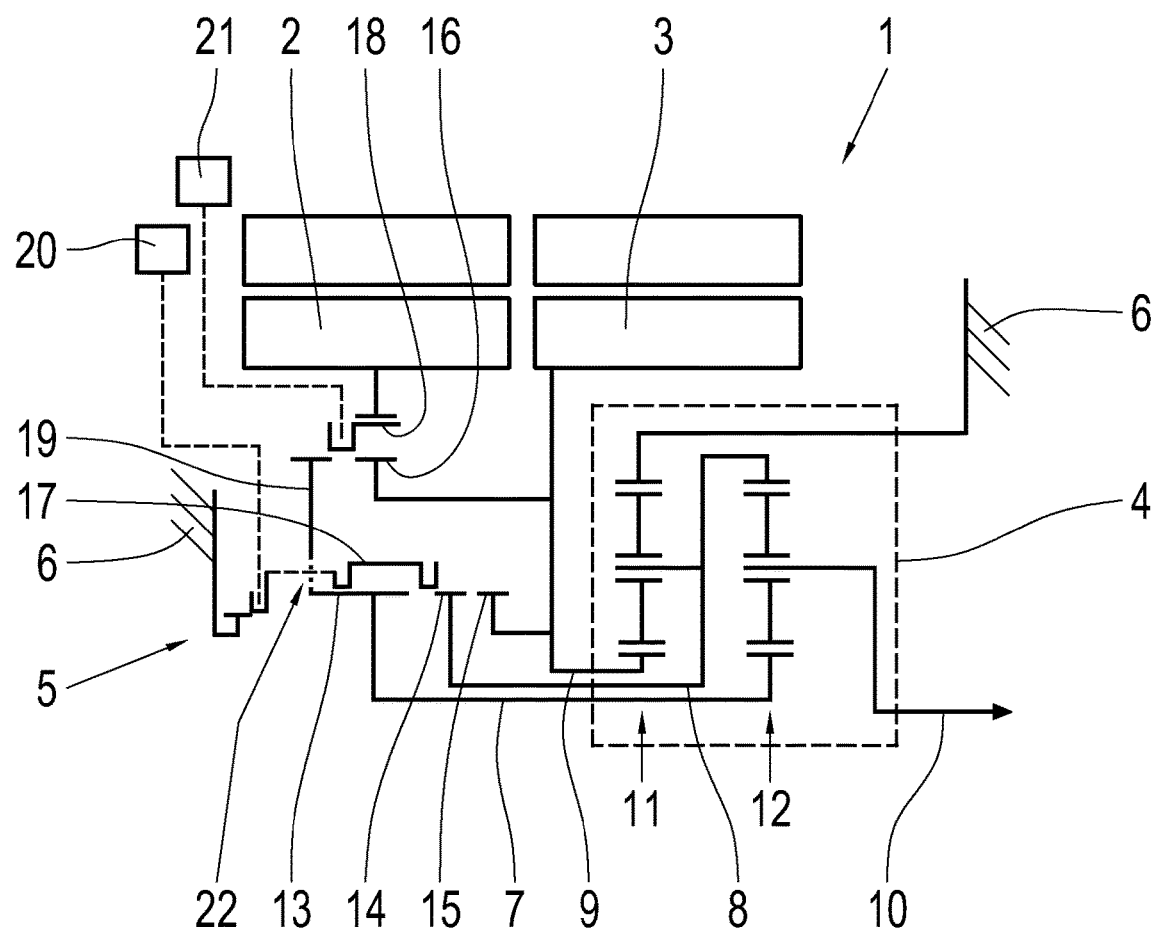
FIG. 1: A drive arrangement with two drive machines, a transmission and a claw cutch.

FIG. 1 shows a powershiftable drive arrangement 1 for a motor vehicle with a first drive machine 2, a second drive machine 3, a transmission 4, a claw-type shifting mechanism 5 and a housing 6.

The drive machines 2, 3 are electric drive machines. The transmission 4 comprises a first shaft 7, a second shaft 8 and a third shaft 9, which form transmission inputs, and a transmission output 10. The transmission 4 has, for example, a first planetary gearset 11 with a sun gear, a planetary carrier and a ring gear, and a second planetary gearset 12 with a sun gear, a planetary carrier and a ring gear. The first shaft 7 serves to drive the sun gear of the second planetary gearset 12, the second shaft 8 serves to drive the planetary carrier of the first planetary gearset 11 and the ring gear of the second planetary gearset 12, and the third shaft 9 serves to drive the sun gear of the first planetary gearset 11. The first shaft 7 is fitted into the second shaft 8. The second shaft 8 is fitted into the third shaft 9. The shafts 7, 8 and 9 have, in each case, an end on the claw shifting mechanism side. The ends of the shafts 7, 8, 9 are arranged axially in sequence in such a manner that the shafts are each accessible in the radial direction.

The claw-type shifting mechanism 5 comprises a first clutch element 13, a second clutch element 14, a third clutch element 15 and a fourth clutch element 16, a first sliding sleeve 17, a second sliding sleeve 18 and a coupling element 19.

The first clutch element 13 is connected rotationally and axially fixed to the first shaft 7 and serves to enable a connection of the first sliding sleeve 17 to the first shaft 7. The second clutch element 14 is connected rotationally and axially fixed to the second shaft 8, and serves to enable a connection of the first sliding sleeve 17 to the second shaft 8. The third clutch element 15 is connected rotationally and axially fixed to the third shaft 9, and serves to enable a connection of the first sliding sleeve 17 to the third shaft 9. The fourth clutch element 16 is connected rotationally and axially fixed to the third shaft 9, and serves to enable a connection of the second sliding sleeve 18 to the third shaft 9.

With the help of a first actuator 20, the first sliding sleeve 17 can be shifted to a first shift position in which a connection between the first shaft 7 and the housing 6 is closed, a second shift position in which a connection is released, a third shift position in which a connection between the first shaft 7 and the second shaft 8 is closed, a fourth shift position in which a connection is released, and a fifth shift position in which a connection between the first shaft 7 and the third shaft 9 is closed. The sliding sleeve 17 can also be operated with only three shift positions, in which a connection between two components is formed.

With the help of a second actuator 21, the second sliding sleeve 18 can be shifted to a first shift position in which a connection between the first drive machine 2 and the first shaft 7 is closed, a second shift position in which a connection is released, and a third shift position in which a connection between the first drive machine 2 and the third shaft 9 is closed.

The coupling element 19 is connected rotationally and axially fixed to the first shaft 7. The first sliding sleeve 17 and the coupling element 19 interpenetrate one another in such a manner that with the help of the passage 22, both a mechanical power flow can take place, via the coupling element 19, and also the first sliding sleeve 17 can be made free from load and axially displaced for shifting purposes.

Figure 2:
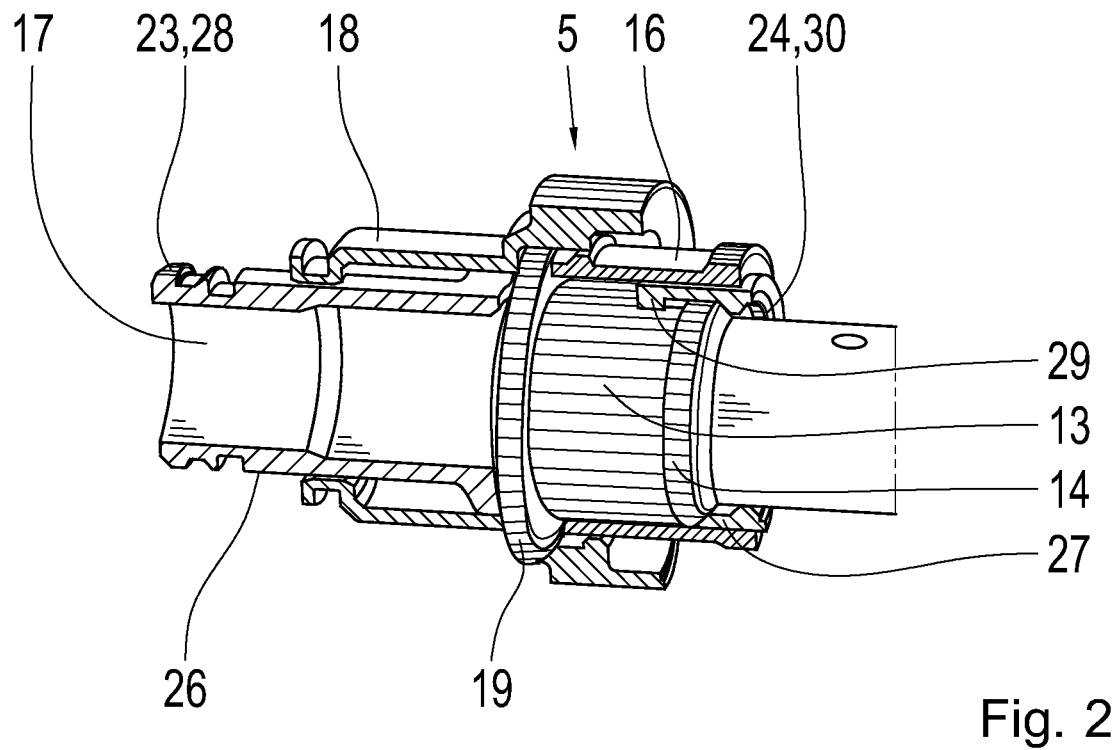
FIG. 2: A claw-type shifting mechanism, viewed in partial cross-section.
Figure 3:
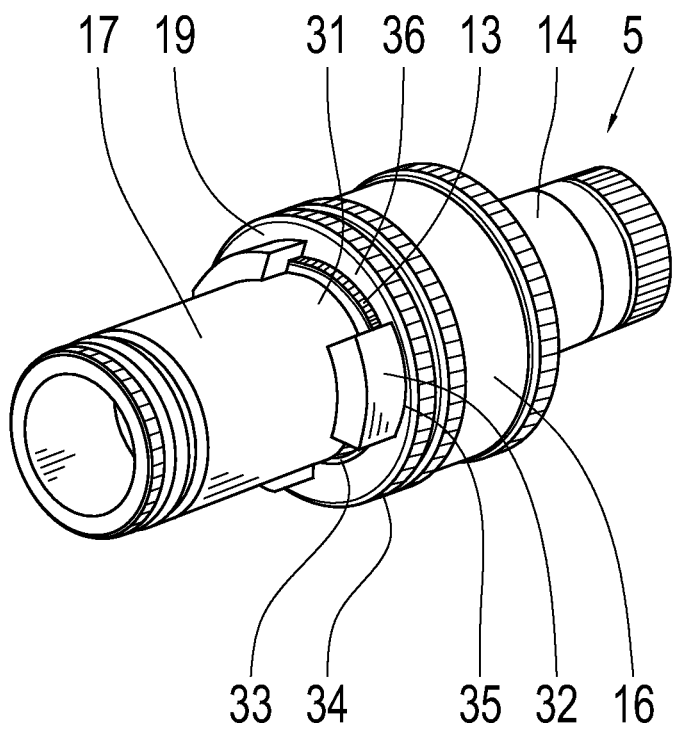
FIG. 3: A first sliding sleeve, a coupling element, a first clutch element, a second clutch element and a third clutch element of a claw-type shifting mechanism, viewed in three dimensions.
Figure 4:
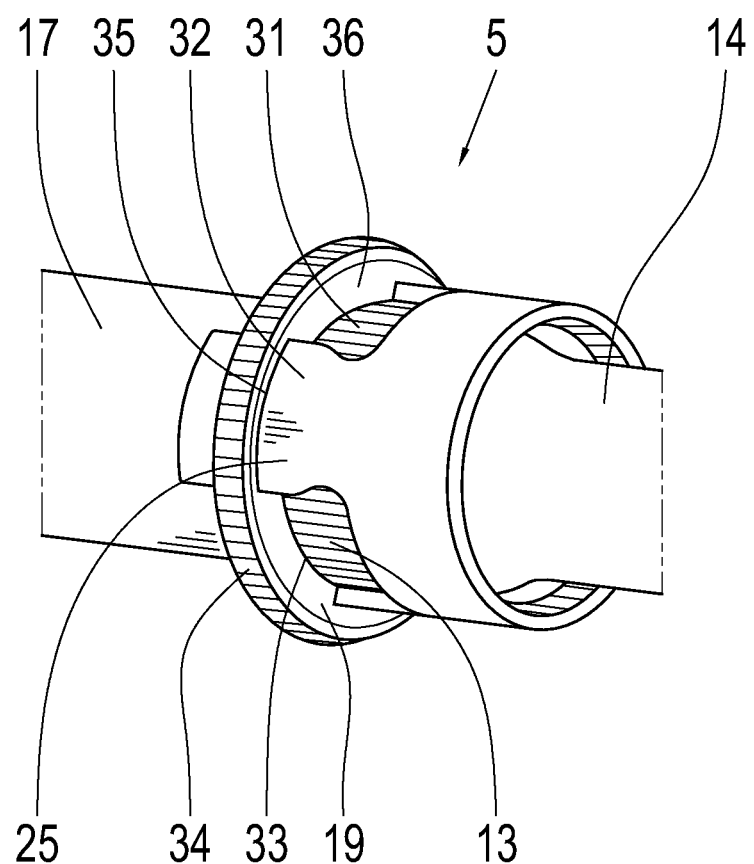
FIG. 4: A first sliding sleeve, a coupling element, a first clutch element and a second clutch element of a claw-type shifting mechanism, viewed in three dimensions.

FIG. 2 shows a design version of the claw-type shifting mechanism 5 in a partially sectioned view. The figure shows the first clutch element 13, the second clutch element 14, the fourth clutch element 16, the first sliding sleeve 17, the second sliding sleeve 18 and the coupling element 19. In this representation the third clutch element 15 is not shown. FIG. 3 shows the first sliding sleeve 17, the coupling element 19, the first clutch element 13, the second clutch element 14 and the fourth clutch element 16 of the claw-type shifting mechanism 5, viewed three-dimensionally. FIG. 4 shows the first sliding sleeve 17, the coupling element 19, the first clutch element 13 and the second cutch element 14 of the claw-type shifting mechanism 5, viewed three-dimensionally.

The first sliding sleeve 17 has a sleeve-like shape with two end sections 23, 24, a central section 25, a first axial section 26, a second axial section 27 and three connecting sections 28, 29, 30 arranged axially in sequence. The connecting section 28 is associated with the housing 6 and is in the form of external teeth, the connecting section 29 is associated with the first shaft 7 and is in the form of internal teeth, and the connecting section 30 is associated with the second shaft 8 and is in the form of internal teeth. On its central section 25, the first sliding sleeve 17 has through-going recesses in the radial direction, such as 31, and web sections such as 32 which extend in the axial direction.

The coupling element 19 has an annular disk-like shape with two connecting sections 33, 34 arranged radially in sequence. The connecting section 33 is associated with the first shaft 7 and is in the form of internal teeth, while the connecting section 34 is associated with the second sliding sleeve 18 and is in the form of external teeth. Radially on the inside, the coupling element 19 has recesses, such as 35, that can be penetrated in the axial direction, and web sections such as 36 that extend in the radial direction.

The first axial section 26 of the first sliding sleeve 17 has a smaller outer diameter suitable for receiving the coupling element 19, which corresponds with some play to an inside diameter of the coupling element 19 at the web sections 36. The second axial section 27 of the first sliding sleeve 17 has a larger outer diameter, which corresponds with some play to an inside diameter of the coupling element 19 at the recesses 35. The web sections 32 of the first sliding sleeve 17 extend through the recesses 35 of the coupling element 19, while the web sections 36 of the coupling element 19 extend through the recesses 31 of the first sliding sleeve 17.

The first sliding sleeve 17 and the coupling element 19 are arranged together in axial sequence, radially on the outside in each case directly on the first shaft 7, with the coupling element 19 arranged on the central section 25 of the first sliding sleeve 17. The coupling element 19 is connected rotationally and axially fixed to the first shaft 7. The first sliding sleeve 17 is connected rotationally fixed to the first shaft 7 and can be axially displaced relative to the coupling element 19 and to the first shaft 7. For that purpose, the recesses 31 of the first sliding sleeve 17 have a length, in the axial direction, that corresponds at least to a shifting path between the first shift position and the fifth shift position.

The second sliding sleeve 18 has a sleeve-like shape and two connecting sections arranged axially in sequence. One connecting section is associated with the first drive machine 2 and is in the form of external teeth, whereas the other connecting section is associated with the coupling element 19 and the third shaft 9, and is in the form of internal teeth. The second sliding sleeve 18 is mounted in such a manner that it can be displaced axially and rotated relative to the first sliding sleeve 17.

The first clutch element 13 is connected rotationally and axially fixed to the first shaft 7 and serves to receive the first sliding sleeve 17. The second clutch element 14 is connected rotationally and axially fixed to the second shaft 8, and corresponds with the connecting section 30 of the first sliding sleeve 17. The fourth clutch element 16 is connected rotationally and axially fixed to the second shaft 8 and is connected to the second drive machine 3, and corresponds to a connecting section of the second sliding sleeve 18. The clutch elements 13, 14 and 16 can, in each case, be made structurally separately, or integrated, in particular as one piece with a shaft.

The passage 22 formed with the recesses 31 and web sections 32 of the first sliding sleeve 17 and the recesses 35 and web sections 36 of the coupling element 19 is designed with some play and can be made free from load in the first shift position of the second sliding sleeve 18 in order to enable the second sliding sleeve 18 to be shifted, whereas with the help of the coupling element 19 a mechanical drive power at the first drive machine 2 is supported, so that shifting steps of the transmission can be powershifted.

In other respects reference should be made to FIGS. 2 to 4 and for additional information to FIG. 1 and the associated description.

The expression "can" denotes optional features of the invention. Consequently, there are also further developments and/or example embodiments of the invention which, in addition or alternatively, embody the particular feature or features concerned.

From the combination of features disclosed herein, if needs be isolated features can also be picked out and used to make the most of a structural and/or functional relationship that may exist between the features in combination with other features for limiting the object of the claim.

INDEXES

1 Drive arrangement
2 First drive machine
3 Second drive machine
4 Transmission
5 Claw-type shifting mechanism
6 Housing
7 First shaft, transmission input
8 Second shaft, transmission input
9 Third shaft, transmission input
10 Transmission output
11 First planetary gearset
12 Second planetary gearset
13 First clutch element
14 Second clutch element
15 Third clutch element
16 Fourth clutch element 17 First sliding sleeve
18 Second sliding sleeve
19 Coupling element
20 First actuator
21 Second actuator
22 Passage
23 End section
24 End section
25 Central section
26 First axial section
27 Second axial section
28 Connecting section
29 Connecting section
30 Connecting section
31 Recess
32 Web section
33 Connecting section
34 Connecting section
35 Recess
36 Web section

The invention claimed is:

1. A claw-type shifting mechanism comprising:
a first sliding sleeve, and
a coupling element,
wherein, in order to produce a passage, the first sliding sleeve and the coupling element each have at least one respective recess and at least one web section,
the first sliding sleeve and the coupling element are arranged together radially on an outside on a first shaft, and
the first sliding sleeve is displaceable along the first shaft and the coupling element is axially and rotationally fixed to the first shaft,
the claw-type shifting mechanism comprises a shiftable second sliding sleeve, which is shiftable between a first shift position in which a connection between a drive machine and the first shaft is closable, a second shift position in which a connection is releasable, and a third shift position in which a connection between the drive machine and a third shaft is closable, and the second sliding sleeve is mounted on the first sliding sleeve.

2. The claw-type shifting mechanism according to claim 1, wherein the first sliding sleeve is shiftable between a first shift position, in which a connection between the first shaft and a housing is closable, a second shift position in which a connection is releasable, a third shift position in which a connection between the first shaft and a second shaft (8) is closable, a fourth shift position in which a connection is releasable, and a fifth shift position in which a connection between the first shaft and the third shaft is closable.

3. The claw-type shifting mechanism according to claim 1, wherein in the first shift position of the second sliding sleeve, the passage is freeable from load in order to enable the shifting of the first sliding sleeve.

4. The claw-type shifting mechanism according to claim 1, wherein the at least one recess of the first sliding sleeve are accessible essentially in a radial direction and the at least one recess of the coupling element are accessible essentially in an axial direction.

5. The claw-type shifting mechanism according to claim 1, wherein the at least one web section of the first sliding sleeve extends essentially in an axial direction and the at least one web section of the coupling element extends essentially in a radial direction.

6. A drive arrangement comprising at least one drive machine, a transmission with a first shaft, a second shaft and a third shaft, and a housing,
wherein the drive arrangement comprises the claw-type shifting mechanism according to claim 1.

7. The drive arrangement according to claim 6, wherein the drive arrangement comprises a first drive machine and a second drive machine, and with the assistance of the claw-type shifting mechanism, shift steps of the transmission are powershiftable.

8. The drive arrangement according to claim 6, wherein the first shaft is located within the second shaft and the second shaft is located within the third shaft.

* * * * *